(12) United States Patent
Roman

(10) Patent No.: US 9,220,246 B1
(45) Date of Patent: Dec. 29, 2015

(54) MULTIFUNCTIONAL FISH AND LOBSTER HARVESTING SYSTEMS

(71) Applicant: Elio Roman, Cutler Bay, FL (US)

(72) Inventor: Elio Roman, Cutler Bay, FL (US)

( * ) Notice: Subject to any disclaimer, the term of this patent is extended or adjusted under 35 U.S.C. 154(b) by 191 days.

(21) Appl. No.: 14/159,877

(22) Filed: Jan. 21, 2014

(51) Int. Cl.
| | |
|---|---|
| A01K 97/14 | (2006.01) |
| A01K 81/04 | (2006.01) |
| A01K 81/06 | (2006.01) |

(52) U.S. Cl.
CPC .............. *A01K 81/04* (2013.01); *A01K 81/06* (2013.01)

(58) Field of Classification Search
USPC ............................ 43/6, 4.5, 5; 124/22, 21, 17
See application file for complete search history.

(56) References Cited

U.S. PATENT DOCUMENTS

| | | | | |
|---|---|---|---|---|
| 2,888,768 | A | | 6/1959 | Taylor |
| 3,006,330 | A | | 10/1961 | De Bach |
| 3,153,875 | A | | 10/1964 | Califano |
| 3,210,880 | A | | 10/1965 | Grenier |
| 3,340,642 | A | | 9/1967 | Vasiljevic |
| 3,540,769 | A | * | 11/1970 | Rosser .................. A01K 97/14 119/804 |
| 4,703,744 | A | * | 11/1987 | Taylor ...................... F41B 3/02 124/20.1 |
| 5,058,306 | A | * | 10/1991 | Sienel .................... A01K 97/14 294/107 |
| 5,243,778 | A | * | 9/1993 | Henley .................. A01K 81/04 43/6 |
| 6,953,034 | B2 | | 10/2005 | May |
| 8,387,602 | B1 | | 3/2013 | Bruington |
| 8,544,455 | B1 | * | 10/2013 | Bruington ................ F41B 7/04 124/22 |
| 8,887,434 | B2 | * | 11/2014 | Waugh .................. A01K 77/00 43/6 |
| 2012/0246995 | A1 | * | 10/2012 | Moore, Jr. .............. A01K 81/04 43/6 |
| 2014/0115945 | A1 | * | 5/2014 | Niki ....................... A01K 81/06 43/6 |

* cited by examiner

*Primary Examiner* — Christopher P Ellis
(74) *Attorney, Agent, or Firm* — RG Patent Consulting, LLC; Rachel Gilboy

(57) ABSTRACT

The multifunctional fish and lobster harvesting system is a device resembling a spear gun that uses an elastic band to propel a thrust shaft through a barrel toward a marine game animal. Either a spear point or a tri-barb gig can be coupled to the front end of the shaft and a lasso-snare is attached to the back end of the shaft. The shaft is propelled by the elastic band, with one end of the band attached to the handle and the other end attached to the back of the shaft. A user pulls the thrust shaft toward the back, stretching the band, and releases the shaft to propel the shaft toward a marine game animal. The shaft never leaves the barrel but stops via a travel limiter on the shaft. The device is able to be used with the back end facing forward to use the lasso-snare.

19 Claims, 5 Drawing Sheets

MULTIFUNCTIONAL FISH AND LOBSTER HARVESTING SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of spear guns and more specifically relates to a multifunctional fish and lobster harvesting system.

2. Description of the Related Art

Spear fishing is an ancient method of fishing that has been used throughout the world for millennia. Early civilizations were familiar with the custom of spearing fish from rivers and streams using sharpened sticks. Today modern spear fishing typically makes use of elastic powered spear guns and slings, or compressed gas pneumatic powered spear guns to strike the hunted fish. Specialized techniques and equipment have been developed for various types of aquatic environments and target fish. Spear fishing may be done using free-diving, snorkeling, or scuba diving techniques.

When spear fishing, a spear is loaded into a spear gun and aimed at the fish to be taken. The spear is a shaft with a sharp point at the end. A spring, an elastic band, or a pneumatic charge propels the spear forward where it leaves the gun and is able to travel for a considerable distance before stopping. The spear may be retrievable, or may be lost after being discharged. Some spears are attached to the gun with a cable so they are more easily retrievable, but reloading can take much time. Generally, spear fishing serves a purpose when little else is practical, and is practiced by professional seamen for harvesting moderate to large sized fish. Because of the expense of the equipment, it is not generally practiced by the average marine recreation seeker. Also, care must be taken when using a spear gun around other swimmers because of the force and weight of the spears and the distances that spears can travel. The average swimmer or fisherman is less likely to use a spear gun due to the aforementioned reasons.

Lion fish are an invasive species of fish that tend to take over an environment and damage the healthy balance of indigenous species, and as such, may be harvested with no restrictions in locations where they proliferate. With no satisfactory solution for controlling the species, the best solution seems to be spear fishing or other similar methods that allow the fisherman to specifically target the lion fish. The problem is, there are not enough people that engage in taking lion fish due to cost and lack of ideal equipment.

Lobsters may be caught using traps that resemble cages. Lobster traps are lowered to the ocean floor with a cable or rope having a buoy tied to the top end so that the trap can be retrieved and checked for lobsters, usually after a day or so. When scuba diving or snorkeling, lobster can be seen in numbers in the right locations. A device that could quickly catch live lobster without harming them or getting the harvester injured, and that is very affordable, would be very useful. A device that addressed all of the above mentioned problems would be of great help while providing many hours of enjoyment for a much larger number of people.

Various attempts have been made to solve the above-mentioned problems such as those found in U.S. Pub. No. 8,387,602 to Robert Kevin Bruington, U.S. Pat. No. 3,340,642 to Vasiljevic Tomislav P., U.S. Pat. No. 2,888,768 to Taylor Ervin W., U.S. Pat. No. 3,153,875 to Paul J Califano, U.S. Pat. No. 3,006,330 to De Bach Paul H, U.S. Pat. No. 3,210,880 to Grenier Richard P, and U.S. Pat. No. 6,953,034 to William May. This art is representative of spear guns. None of the above inventions and patents, taken either singly or in combination, is seen to describe the invention as claimed.

Ideally, a spear gun should be multifunctional for harvesting various types of marine sea animals while having the ability to snare lobsters unharmed and, yet would operate reliably and be manufactured at a modest expense. Thus, a need exists for a reliable multifunctional fish and lobster harvesting system to avoid the above-mentioned problems.

BRIEF SUMMARY OF THE INVENTION

In view of the foregoing disadvantages inherent in the known spear gun art, the present invention provides a novel multifunctional fish and lobster harvesting system. The general purpose of the present invention, which will be described subsequently in greater detail, is to provide a multifunctional snare, gig, and spear gun at a very affordable cost for the average person (spear-fishing enthusiast).

The present invention, multifunctional fish and lobster harvesting system, as disclosed herein, preferably comprises: a harvester assembly having a main body with a guide barrel and a handle, a thrust shaft having a proximate end and a distal end, a tip coupler, a shaft travel limiter having a through aperture, a snare cable having a loop hole end and a lasso end, a spear point having a first coupler end and a point end, a tri-barb gig having a gig end a second coupler end, a thrust band having a first end and a second end, and a measuring gauge.

The guide barrel of the main body of the harvester assembly is preferably integral with the handle, which may have finger-grips, and is positioned substantially perpendicular to the top end of the handle. The guide barrel comprises a cylindrical through-hole concentrically located along the longitudinal axis. The thrust shaft may be cylindrically shaped and comprises an outer cross-sectional diameter that is less than the cross-sectional diameter of the inner periphery of the cylindrical through-hole of the guide barrel so that the thrust shaft is able to non-frictionally slide through the guide barrel. The thrust shaft is able to be removed from the guide barrel but under normal operating conditions, the thrust shaft slides forward and rearward but never leaves the guide barrel. The guide barrel is able to guide the thrust shaft in a straight trajectory during a releasing of the band-tensioned thrust shaft but stops when the shaft travel limiter contacts the back end of the guide barrel. The cylindrical through-hole of the guide barrel comprises a smaller-diameter than the outer-diameter of the shaft travel limiter so that the thrust shaft is unable slide out of the cylindrical through-hole.

The thrust shaft in preferred embodiments may comprise fiberglass so that it is light weight and able to glide through water with a minimum of resistance, but may also be made of metal or carbon fiber in some alternate embodiments. The spear point is preferably metal and may have machined threads about the inner periphery of the first coupler end so that the spear point is able to be removably fastened to the tip coupler. The point end of the spear point may be a relatively small diameter and cylindrically shaped metal shaft having a point at the end. The tip coupler is non-removably attached to the distal end of the thrust shaft and may comprise machined threads about the outer periphery in some embodiments. The shaft travel limiter may be spherical and non-removably attached to the distal end of the thrust shaft. The through aperture of the shaft travel limiter passes through the center point of the shaft travel limiter about perpendicular to the longitudinal axis of the thrust shaft. The shaft travel limiter is able to be used as a grip for sliding the thrust shaft to the rearmost position in the guide barrel, tensioning the thrust band in a ready-to-release position.

The thrust band may comprise tubular rubber but may be a flat band in some embodiments. The second end of the thrust band is attached to the loop hole end of the snare cable via an eye-hook. The handle may comprise a rigid non-removable rod perpendicularly disposed to the top end of the handle such that the first end of the thrust band is able to be removably attached to the end of the rod. The rigid non-removable rod may have a spherical enlargement at the outer end so that a tubular shaped thrust band is able to be stretched over and tied behind the spherical enlargement for a reliable attachment. The loop end and the lasso end of the snare cable are located at opposing ends of the snare cable and each are made by doubling the cable through crimp lugs and crimping the lugs. The snare cable is non-slideably and non-removably attached to the shaft travel limiter through the through aperture near the loop end of the snare cable. The first end of the thrust band is removably attached to the handle and the second end of the thrust band is removably attached to the loop end of the snare cable such that the thrust band is able to be tensionally-stretched via a rearward sliding of the thrust shaft to provide a forward propulsion of the thrust shaft when the thrust shaft is tensionally-released.

The first coupler end of the spear point is able to be removably coupled to the tip coupler of the distal end of the thrust shaft, the point end of the spear point is located at the obverse end of the spear point from the first coupler end. The tri-barb gig and the spear point may comprise machined threads about the inner periphery of the second coupler end and first coupler end respectively, so that the tri-barb gig (single and other multiple barbed gigs may be used) or the spear point is able to be removably fastened to the tip coupler of the thrust shaft. In a second embodiment, the second coupler end of the tri-barb gig and the first coupler end of the spear tip may be smooth and frictionally slide into a cylindrical recess in the coupler end of the thrust shaft to hold either tip. In either embodiment, the second coupler end of the tri-barb gig is able to be removably coupled to the tip coupler of the distal end of the thrust shaft, with the gig end of the spear point located at a reverse end of the tri-barb gig from the second coupler end.

The guide barrel may comprise a lengthwise slot in the exterior periphery so that the measuring gauge can be frictionally inserted perpendicularly to the exterior periphery, and non-removably attached to the guide barrel with nylon tie straps. The measuring gauge may be about 6 inches long but may be longer or shorter in other embodiments. A captured fish or a captured lobster is able to be quickly and conveniently measured by the attached measuring gauge with this feature. The harvester assembly is able to be used in a forward facing direction when using the spear point and the tri-barb gig, and in a rearward facing direction when using the snare cable. By sliding the thrust shaft to the rear, which is the front when using the harvester assembly in a backward facing direction, the snare cable is able to be rapidly tightened when the thrust shaft is tensionally-released. The harvester assembly is useful for releasably spearing, gigging, or lasso-snaring an aquatic game animal via the releasing of a band-tensioned thrust shaft by a user for recreation or sport fishing.

The multifunctional fish and lobster harvesting system may be offered as a kit having: at least one main body having a guide barrel and a handle, at least one thrust shaft with a tip coupler and a shaft travel limiter having a snare cable, at least one spear point, at least one tri-barb gig, at least one thrust band, at least one measuring gauge, and at least one set of user instructions.

A method of using a multifunctional fish and lobster harvesting system may comprise the steps of: taking a fully assembled harvester assembly to an aquatic location of use, locating a user acceptable aquatic game animal, gripping a shaft travel limiter and tension-sliding rearward the thrust shaft, pointing the thrust shaft at the acceptable aquatic game animal, releasing the thrust shaft to spear, gig, or snare the aquatic game animal as needed, removing the acceptable aquatic game animal from the harvester assembly, and storing the harvester assembly for future use.

The present invention holds significant improvements and serves as a multifunctional fish and lobster harvesting system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, multifunctional fish and lobster harvesting system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a spear gun and more particularly to a multifunctional fish and lobster harvesting system as used to provide multiple functions and lower cost.

Generally speaking, the multifunctional fish and lobster harvesting system is a device resembling a spear gun that uses an elastic band to propel a thrust shaft through a barrel toward a marine game animal. A spear point or a tri-barb gig is able to be coupled to the front end of the shaft and a lasso-snare is attached to the back end of the shaft. The shaft is propelled by the elastic band, with one end of the band attached to the handle and the other end attached to the back of the shaft. A user pulls the thrust shaft toward the back, stretching the band, and releases the shaft to propel the shaft toward a marine game animal. The shaft never leaves the barrel but only travels the length of the shaft and stops when a spherical ball attached to the back of the shaft contacts the back of the barrel. The device is able to be used with the back end facing forward to use the lasso-snare.

Figure 1:
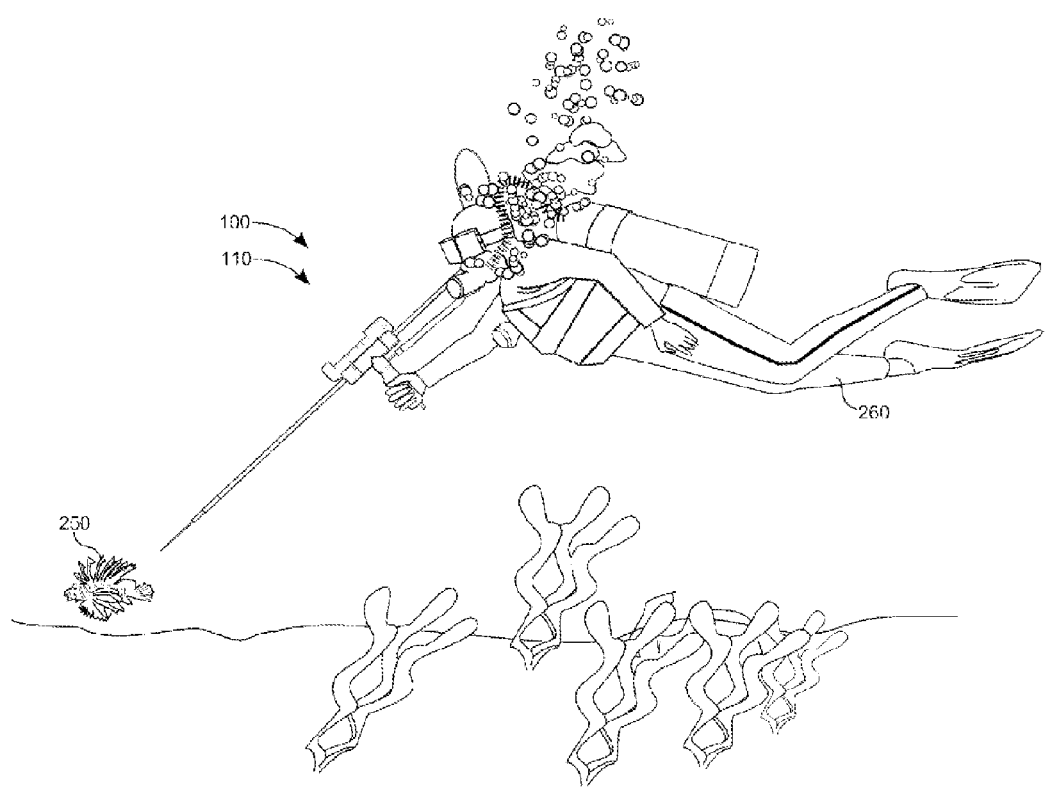
FIG. 1 shows a perspective view illustrating an in-use condition of a multifunctional fish and lobster harvesting system according to an embodiment of the present invention.

In greater detail now, referring to the drawings by numerals of reference, there is shown in FIG. 1, a perspective view illustrating an in-use condition of multifunctional fish and lobster harvesting system 100 according to an embodiment of the present invention.

Multifunctional fish and lobster harvesting system 100 is a multi-purpose device for spearing, gigging, or snaring various types of small marine game animal(s) 250. The device may be used by recreational user(s) 260 or by marine game animal 250 hunters. Thrust shaft 150 with user 260 preferred hunting point at distal end 154, travels forward and backward within guide barrel 130 but is designed to never leave guide barrel 130 during normal use. Thrust shaft 150 has a length such that user 260 is able to approach a marine game animal 250 such as a fish or a lobster without alarming the animal and then spearing, gigging, or snaring the animal via the high speed travel of thrust shaft 150. Used in the forward facing position, marine game animal 250 can be speared or gigged, and with the device facing rearward, snare cable 180 can be used. The device is particularly suited for snaring lobster or lion fish and spearing or gigging other similar sized fish. An attached measuring gauge 220 is readily available for measuring the caught marine game animal 250 and measuring to comply with local marine game animal 250 harvesting length rules.

Figure 2:
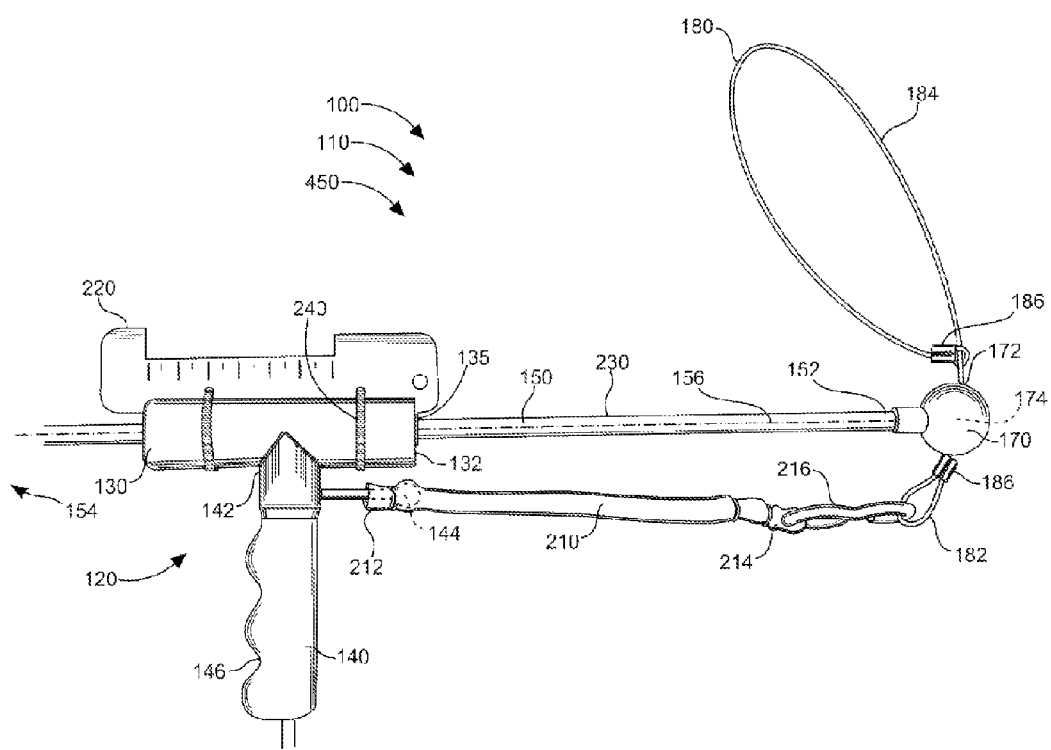
FIG. 2 is a perspective view illustrating the multifunctional fish and lobster harvesting system according to an embodiment of the present invention of FIG. 1.

Referring now to FIG. 2, a perspective view illustrating multifunctional fish and lobster harvesting system 100 according to an embodiment of the present invention of FIG. 1.

The device preferably comprises harvester assembly 110 having main body 120 with guide barrel 130 and handle 140, thrust shaft 150 having proximate end 152 and distal end 154, tip coupler 160, shaft travel limiter 170 having through aperture 172, snare cable 180 having loop hole end 182 and lasso end 184; spear point 190 having first coupler end 192 and point end 194; tri-barb gig 200 having gig end 202 and second coupler end 204; thrust band 210 having first end 212 and second end 214, and measuring gauge 220.

Thrust shaft 150 may comprise fiberglass so that it is suitably light weight and able to glide through water with a minimum of resistance, but may also be made of metal (ferrous or non-ferrous or alloy) or carbon fiber in some embodiments. Shaft travel limiter 170 may be spherical and non-removably attached to distal end 154 of thrust shaft 150. Through aperture 172 of shaft travel limiter 170 passes through center point 174 of shaft travel limiter 170 about perpendicular to longitudinal axis 156 of thrust shaft 150. Shaft travel limiter 170 is able to be used as a grip for sliding thrust shaft 150 to rearmost position in guide barrel 130, and tensioning thrust band 210 to a ready-to-release position. Thrust band 210 may comprise tubular rubber but may be a flat band in some embodiments. Second end 214 of thrust band 210 is attached to loop hole end 182 of snare cable 180 via eye-hook 216.

Handle 140 may comprise a rigid non-removable rod 230 perpendicularly disposed to top end 142 of handle 140 such that first end 212 of thrust band 210 is able to be removably attached to outer end 144 of rod 230. Rigid non-removable rod 230 may have a spherical enlargement at outer end 144 so that a tubular shaped thrust band 210 is able to be stretched over and tied behind the spherical enlargement of outer end 144 for a reliable attachment. Loop hole end 182 and lasso end 184 of snare cable 180 are located at opposing ends of snare cable 180 and each are made by doubling snare cable 180 through crimp lug(s) 186 and crimping.

Figure 3:
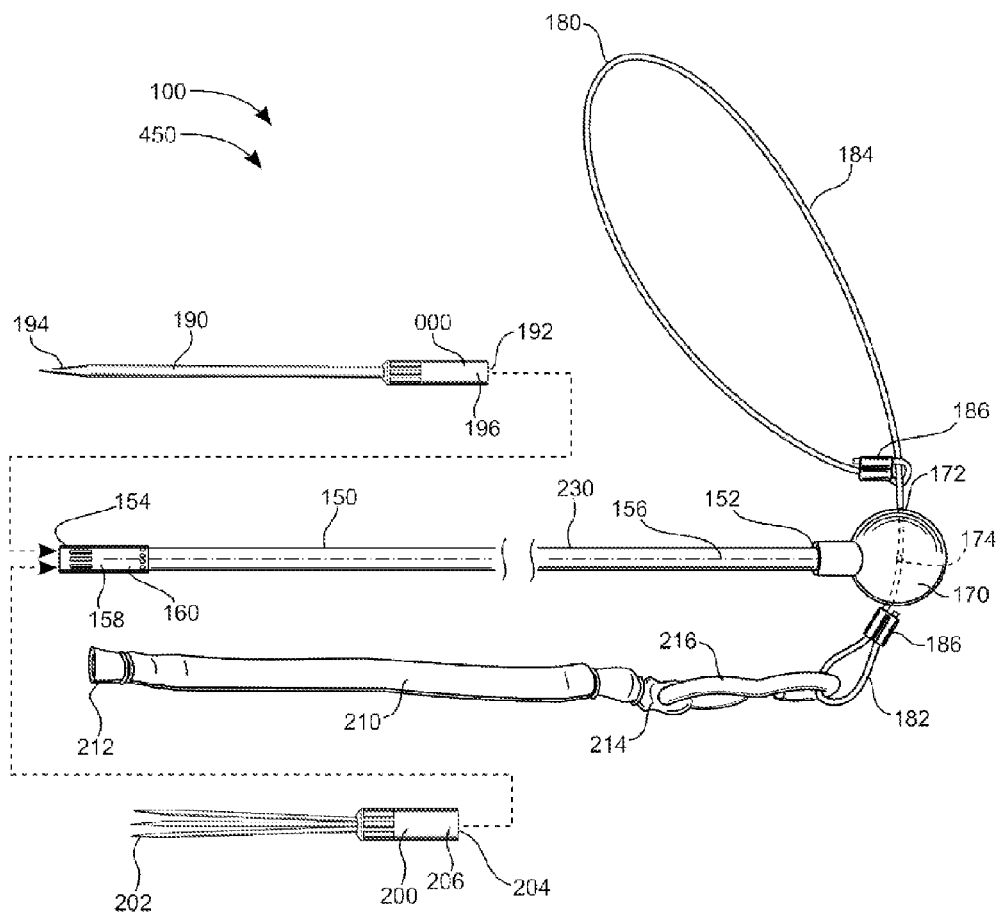
FIG. 3 is a perspective view illustrating a spear point, a tri-barb gig, and a snare cable for a thrust shaft of the multifunctional fish and lobster harvesting system according to an embodiment of the present invention of FIG. 1.

Referring now to FIG. 3, a perspective view illustrating spear point 190, a tri-barb gig 200, and snare cable 180 for thrust shaft 150 of multifunctional fish and lobster harvesting system 100 according to an embodiment of the present invention of FIG. 1.

Spear point 190 is preferably metal and may have machined threads about the inner periphery of first coupler end 192 so that spear point 190 is able to be removably fastened to tip coupler 160. Point end 194 of spear point 190 may be a relatively small diameter and cylindrically shaped metal shaft having a point at point end 194. Tip coupler 160 is non-removably attached to distal end 154 of thrust shaft 150 and may comprise machined threads about the outer periphery. First coupler end 192 of spear point 190 is able to be removably coupled to tip coupler 160 of distal end 154 of thrust shaft 150, point end 194 of spear point 190 located at obverse end 196 of spear point 190 from first coupler end 192.

Tri-barb gig 200 and spear point 190 may comprise machined threads about the inner periphery of second coupler end 204 and first coupler end 192 respectively, so that tri-barb gig 200 or spear point 190 is able to be removably fastened to tip coupler 160 of thrust shaft 150. In a second embodiment, second coupler end 204 of tri-barb gig 200 and first coupler end 192 of spear point 190 may be smooth and frictionally slide into a cylindrical recess in tip coupler 160 of thrust shaft 150 to hold either spear point 190 or tri-barb gig 200. In either embodiment, second coupler end 204 of tri-barb gig 200 is able to be removably coupled to tip coupler 160 of distal end 154 of thrust shaft 150, with gig end 202 of tri-barb gig 200 located at reverse end 206 of tri-barb gig 200 from second coupler end 204.

Snare cable 180 is preferably non-slideably and non-removably attached to shaft travel limiter 170 passing through through aperture 172 near loop hole end 182 of snare cable 180. Harvester assembly 110 is able to be used in a forward facing direction when using spear point 190 and tri-barb gig 200, and in a rearward facing direction when using snare cable 180. By sliding thrust shaft 150 to the rear, which is the front when using harvester assembly 110 in a backward facing direction, snare cable 180 is able to be rapidly tightened when thrust shaft 150 is tensionally-released. Harvester assembly 110 is useful for releasably spearing, gigging, or lasso-snaring an aquatic game animal via releasing of a band-tensioned thrust shaft 150 by a user 260 for recreation or sport fishing.

Figures 4A, 4B:
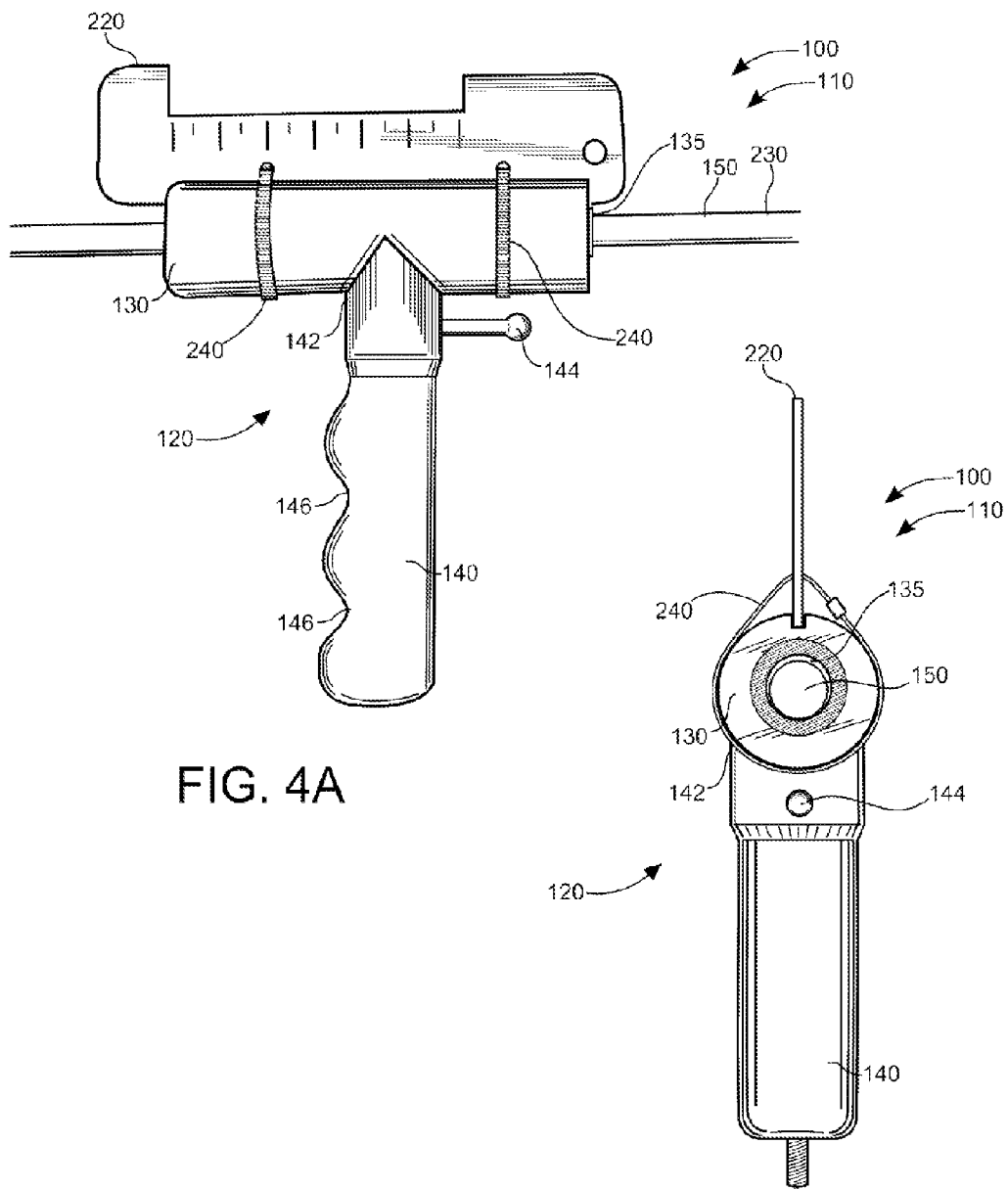
FIGS. 4A and 4B are left side and back side perspective views respectively, illustrating a main body with an attached measuring gauge of the multifunctional fish and lobster harvesting system according to an embodiment of the present invention of FIG. 1.

Referring now to FIGS. 4A and 4B are left side and back side perspective views respectively, illustrating main body 120 with an attached measuring gauge 220 of multifunctional fish and lobster harvesting system 100 according to an embodiment of the present invention of FIG. 1.

Guide barrel 130 of main body 120 of harvester assembly 110 is integral with handle 140, which may have finger-grips 146, and is positioned substantially perpendicular to top end 142 of handle 140. Guide barrel 130 comprises a cylindrical through-hole 135 concentrically located along longitudinal axis 156. Thrust shaft 150 may be cylindrically shaped and comprises an outer cross-sectional diameter that is less than a cross-sectional diameter of the inner periphery of cylindrical through-hole 135 of guide barrel 130 so that thrust shaft 150 is able to non-frictionally slide through guide barrel 130. Thrust shaft 150 is able to be removed from guide barrel 130 but under normal operating conditions, thrust shaft 150 slides forward and rearward but never leaves guide barrel 130.

Guide barrel 130 is able to guide thrust shaft 150 in a straight trajectory during a releasing of the band-tensioned thrust shaft 150 but stops when shaft travel limiter 170 contacts back end 132 of guide barrel 130. The cylindrical through-hole 135 of guide barrel 130 comprises a smaller-diameter than the outer-diameter of shaft travel limiter 170 so that thrust shaft 150 is unable to slide out of the cylindrical through-hole 135. First end 212 of thrust band 210 is removably attached to handle 140 and second end 214 of thrust shaft 150 is removably attached to loop hole end 182 of snare cable 180 such that thrust band 210 is able to be tensionally-stretched via a rearward sliding of thrust shaft 150 to provide a forward propulsion of thrust shaft 150 when it is tensionally-released.

Guide barrel 130 may comprise a lengthwise slot in the exterior periphery so that measuring gauge 220 can be frictionally inserted perpendicularly to the exterior periphery, and non-removably attached to guide barrel 130 with nylon tie straps 240. Measuring gauge 220 may be about 6 inches long but may be longer or shorter in other embodiments. A captured fish or a captured lobster is able to be quickly and conveniently measured by the attached measuring gauge 220.

Multifunctional fish and lobster harvesting system 100 may be sold as kit 450 comprising the following parts: at least one main body 120 having guide barrel 130 and handle 140; at least one thrust shaft 150 with tip coupler 160 and shaft travel limiter 170 having snare cable 180; at least one spear point 190; at least one tri-barb gig 200; at least one thrust band 210; at least one measuring gauge 220; and at least one set of user instructions. The kit has instructions such that functional relationships are detailed in relation to the structure of the invention (such that the invention can be used, maintained, or the like in a preferred manner). Multifunctional fish and lobster harvesting system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different coupler means and gig combinations may be used, parts may be sold separately, etc., may be sufficient.

Figure 5:
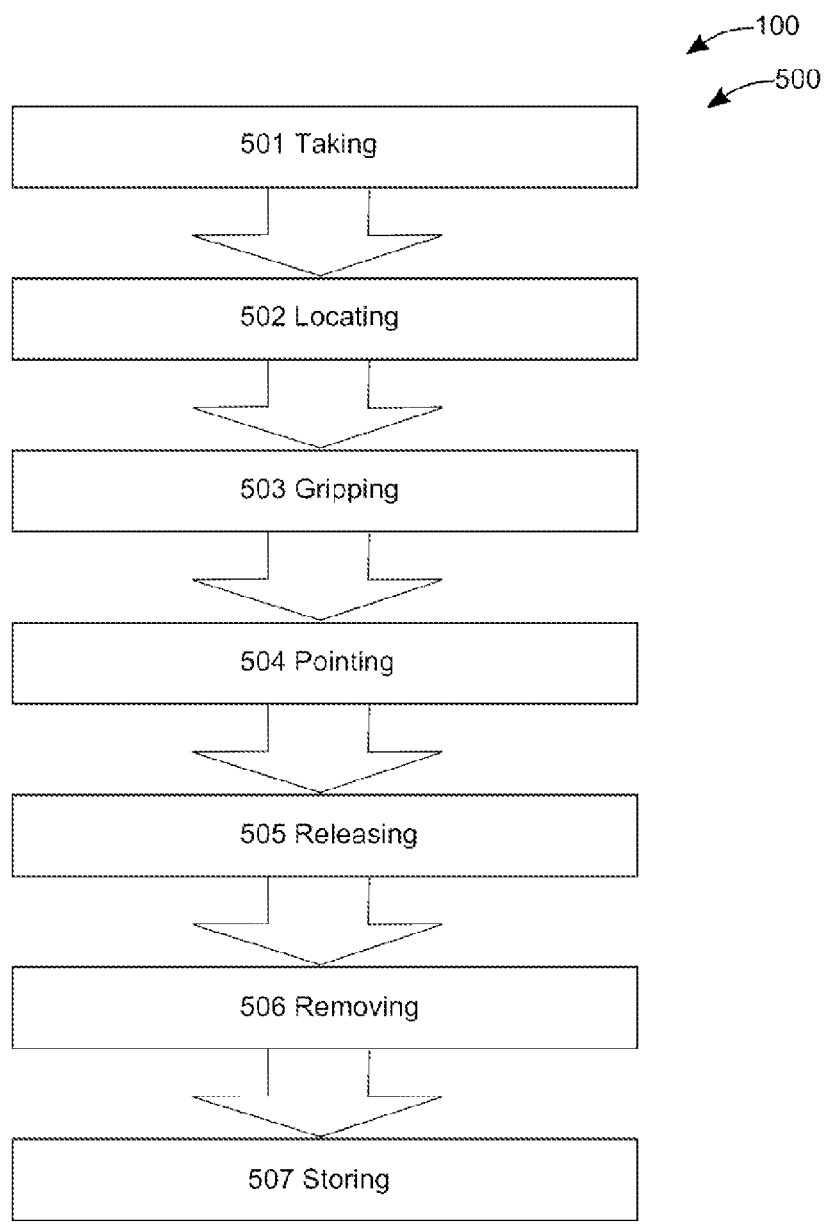
FIG. 5 is a flowchart illustrating a method of use for the multifunctional fish and lobster harvesting system according to an embodiment of the present invention of FIGS. 1-4.

Referring now to FIG. 5, showing method of use 500 for multifunctional fish and lobster harvesting system 100. A method of using (method of use 500) multifunctional fish and lobster harvesting system 100 may comprise the steps of: step one 501 taking a fully assembled harvester assembly 110 to an aquatic location of use; step two 502 locating a user (260) acceptable marine game animal 250; step three 503 gripping shaft travel limiter 170 and tension-sliding rearwardly thrust shaft 150; step four 504 pointing thrust shaft 150 at the acceptable marine game animal 250; step five 505 releasing thrust shaft 150 to spear, gig, or snare marine game animal 250 as needed; step six 506 removing the caught marine game animal 250 from harvester assembly 110; and step seven 507 storing harvester assembly 110 for future use.

It should be noted that step 506 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A multifunctional fish and lobster harvesting system comprising:
   a harvester assembly comprising;
      a main body having;
         a guide barrel; and
         a handle;
      a thrust shaft having a proximate end and a distal end;
      a tip coupler;
      a shaft travel limiter having;
         a through aperture; and
         a snare cable having a loop hole end and a lasso end;
      a spear point having a first coupler end and a point end;
      a tri-barb gig having a gig end and a second coupler end; and
      a thrust band having a first end and a second end; and
   a measuring gauge;
   wherein said guide barrel of said main body of said harvester assembly is integral with said handle and positioned substantially perpendicular to a top end of said handle;
   wherein said guide barrel comprises a cylindrical through-hole concentrically located along a longitudinal axis of said guide barrel;

wherein said thrust shaft is cylindrically shaped and comprises a cross-sectional diameter that is less than a cross-sectional diameter of an inner periphery of said cylindrical through-hole of said guide barrel such that said thrust shaft is able to non-frictionally slide through said guide barrel and removably located therethrough;

wherein said tip coupler is non-removably attached to said distal end of said thrust shaft;

wherein said shaft travel limiter is non-removably attached to said distal end of said thrust shaft;

wherein said through aperture passes through a center point of said shaft travel limiter about perpendicular to said longitudinal axis of said thrust shaft;

wherein said loop end and said lasso end of said snare cable are located at opposing ends of said snare cable;

wherein said snare cable is non-slideably and non-removably attached to said shaft travel limiter through said through aperture near said loop end of said snare cable;

wherein said first end of said thrust band is removably attached to said handle and said second end of said thrust band is removably attached to said loop end of said snare cable such that said thrust band is able to be tensionally-stretched via a rearward sliding of said thrust shaft to provide a forward propulsion of said thrust shaft when said thrust shaft is tensionally-released and thereby rapidly tightening said lasso end;

wherein said first coupler end of said spear point is able to be removably coupled to said tip coupler of said distal end of said thrust shaft, said point end of said spear point located at an obverse end of said spear point from said first coupler end;

wherein said second coupler end of said tri-barb gig is able to be removably coupled to said tip coupler of said distal end of said thrust shaft, said gig end of said spear point located at a reverse end of said tri-barb gig from said second coupler end;

wherein said measuring gauge is non-removably attached to said guide barrel such that a captured fish and alternately a captured lobster is able to be conveniently measured; and wherein said harvester assembly is useful for releasably spearing and alternately releasably gigging and alternately releasably lasso-snaring an aquatic game animal via a releasing of a band-tensioned said thrust shaft of a harvester assembly by a user.

2. The multifunctional fish and lobster harvesting system of claim 1 wherein said guide barrel comprises a lengthwise slot in an exterior periphery such that said measuring gauge is frictionally insertable perpendicularly to said exterior periphery, and non-removably attached via a cable tie band.

3. The multifunctional fish and lobster harvesting system of claim 1 wherein said handle of said main body comprises finger-grips.

4. The multifunctional fish and lobster harvesting system of claim 1 wherein said thrust shaft comprises fiberglass such that said thrust shaft is light weight and able to glide through water with a minimum of resistance.

5. The multifunctional fish and lobster harvesting system of claim 1 wherein said tip coupler comprises machined threads about an outer periphery.

6. The multifunctional fish and lobster harvesting system of claim 1 wherein said spear point comprises machined threads about an inner periphery of said first coupler end such that said spear point is able to be removably fastened to said tip coupler.

7. The multifunctional fish and lobster harvesting system of claim 6 wherein said tri-barb gig comprises machined threads about an inner periphery of said second coupler end such that said tri-barb gig is able to be removably fastened to said tip coupler.

8. The multifunctional fish and lobster harvesting system of claim 1 wherein said shaft travel limiter comprises a grip such that said user is able to grip said shaft travel limiter to slide-tension said thrust shaft via said thrust band.

9. The multifunctional fish and lobster harvesting system of claim 1 wherein said loop-hole end and said lasso end of said snare cable comprise crimped lugs.

10. The multifunctional fish and lobster harvesting system of claim 1 wherein said thrust band comprises tubular rubber.

11. The multifunctional fish and lobster harvesting system of claim 2 wherein said guide barrel is able to guide said thrust shaft in a straight trajectory during said releasing of said band-tensioned said thrust shaft.

12. The multifunctional fish and lobster harvesting system of claim 11 wherein said cylindrical through-hole of said guide barrel comprises a smaller-diameter than an outer-diameter of said shaft travel limiter such that said thrust shaft is unable to exit said guide barrel during said releasing of said band-tensioned said thrust shaft.

13. The multifunctional fish and lobster harvesting system of claim 1 wherein said measuring gauge is about 6 inches long.

14. The multifunctional fish and lobster harvesting system of claim 1 wherein said shaft travel limiter is spherical.

15. The multifunctional fish and lobster harvesting system of claim 1 wherein said thrust band is attached to said loop hole end of said snare cable via an eye-hook.

16. The multifunctional fish and lobster harvesting system of claim 1 wherein said handle comprises a rigid non-removable rod perpendicularly disposed to said top end of said handle such that said first end of said thrust band is able to be removably attached thereto.

17. The multifunctional fish and lobster harvesting system of claim 1 wherein said harvester assembly is able to be used in a forward facing direction when using said spear point and said tri-barb gig and in a rearward facing direction when using said snare cable.

18. A multifunctional fish and lobster harvesting system comprising:
a harvester assembly comprising;
a main body having;
a guide barrel; and
a handle;
a thrust shaft having a proximate end and a distal end;
a tip coupler;
a shaft travel limiter having;
a through aperture; and
a snare cable having a loop hole end and a lasso end;
a spear point having a first coupler end and a point end;
a tri-barb gig having a gig end and a second coupler end; and
a thrust band having a first end and a second end; and
a measuring gauge;
wherein said guide barrel of said main body of said harvester assembly is integral with said handle and positioned substantially perpendicular to a top end of said handle;
wherein said handle of said main body comprises finger-grips;
wherein said guide barrel comprises a cylindrical through-hole concentrically located along a longitudinal axis of said guide barrel;

wherein said thrust shaft is cylindrically shaped and comprises a cross-sectional diameter that is less than a cross-sectional diameter of an inner periphery of said cylindrical through-hole of said guide barrel such that said thrust shaft is able to non-frictionally slide through said guide barrel and removably located therethrough;

wherein said guide barrel is able to guide said thrust shaft in a straight trajectory during said releasing of said band-tensioned said thrust shaft;

wherein said thrust shaft comprises fiberglass such that said thrust shaft is light weight and able to glide through water with a minimum of resistance;

wherein said spear point comprises machined threads about an inner periphery of said first coupler end such that said spear point is able to be removably fastened to said tip coupler;

wherein said tip coupler is non-removably attached to said distal end of said thrust shaft;

wherein said tip coupler comprises machined threads about an outer periphery;

wherein said shaft travel limiter is non-removably attached to said distal end of said thrust shaft;

wherein said shaft travel limiter is spherical;

wherein said cylindrical through-hole of said guide barrel comprises a smaller-diameter than an outer-diameter of said shaft travel limiter such that said thrust shaft is unable to exit said guide barrel during said releasing of said band-tensioned said thrust shaft;

wherein said through aperture passes through a center point of said shaft travel limiter about perpendicular to said longitudinal axis of said thrust shaft;

wherein said shaft travel limiter comprises a grip such that said user is able to grip said shaft travel limiter to slide-tension said thrust shaft via said thrust band;

wherein said thrust band comprises tubular rubber;

wherein said thrust band is attached to said loop hole end of said snare cable via an eye-hook;

wherein said handle comprises a rigid non-removable rod perpendicularly disposed to said top end of said handle such that said first end of said thrust band is able to be removably attached thereto;

wherein said loop end and said lasso end of said snare cable are located at opposing ends of said snare cable;

wherein said loop-hole end and said lasso end of said snare cable comprise crimped lugs;

wherein said snare cable is non-slideably and non-removably attached to said shaft travel limiter through said through aperture near said loop end of said snare cable;

wherein said first end of said thrust band is removably attached to said handle and said second end of said thrust band is removably attached to said loop end of said snare cable such that said thrust band is able to be tensionally-stretched via a rearward sliding of said thrust shaft to provide a forward propulsion of said thrust shaft when said thrust shaft is tensionally-released and thereby rapidly tightening said lasso end;

wherein said first coupler end of said spear point is able to be removably coupled to said tip coupler of said distal end of said thrust shaft, said point end of said spear point located at an obverse end of said spear point from said first coupler end;

wherein said tri-barb gig comprises machined threads about an inner periphery of said second coupler end such that said tri-barb gig is able to be removably fastened to said tip coupler;

wherein said second coupler end of said tri-barb gig is able to be removably coupled to said tip coupler of said distal end of said thrust shaft, said gig end of said spear point located at a reverse end of said tri-barb gig from said second coupler end;

wherein said guide barrel comprises a lengthwise slot in an exterior periphery such that said measuring gauge is frictionally insertable perpendicularly to said exterior periphery, and non-removably attached via a cable tie band;

wherein said measuring gauge is about 6 inches long;

wherein said measuring gauge is non-removably attached to said guide barrel such that a captured fish and alternately a captured lobster is able to be conveniently measured;

wherein said harvester assembly is able to be used in a forward facing direction when using said spear point and said tri-barb gig and in a rearward facing direction when using said snare cable; and wherein said harvester assembly is useful for releasably spearing and alternately releasably gigging and alternately releasably lasso-snaring an aquatic game animal via a releasing of a band-tensioned said thrust shaft of a harvester assembly by a user.

19. The multifunctional fish and lobster harvesting system of claim 18 further comprising
a kit including:
at least one said main body having said guide barrel and said handle;
at least one said thrust shaft having said tip coupler and said shaft travel limiter having said snare cable;
at least one said spear point;
at least one said tri-barb gig;
at least one said thrust band;
at least one said measuring gauge; and
at least one set of user instructions.

* * * * *